US010679196B2

(12) United States Patent
Paintin

(10) Patent No.: US 10,679,196 B2
(45) Date of Patent: Jun. 9, 2020

(54) BILL PAYMENT AGGREGATION SERVICE

(75) Inventor: Scott Paintin, Littleton, CO (US)

(73) Assignee: The Western Union Company, Denver, CO (US)

(*) Notice: Subject to any disclaimer, the term of this patent is extended or adjusted under 35 U.S.C. 154(b) by 983 days.

(21) Appl. No.: 11/863,906

(22) Filed: Sep. 28, 2007

(65) Prior Publication Data

US 2009/0089193 A1   Apr. 2, 2009

(51) Int. Cl.
G06Q 20/14  (2012.01)
G06Q 20/02  (2012.01)
G06Q 30/04  (2012.01)
G06Q 20/10  (2012.01)

(52) U.S. Cl.
CPC ............ *G06Q 20/14* (2013.01); *G06Q 20/02* (2013.01); *G06Q 20/102* (2013.01); *G06Q 30/04* (2013.01)

(58) Field of Classification Search
None
See application file for complete search history.

(56) References Cited

U.S. PATENT DOCUMENTS

| 5,483,445 | A | * | 1/1996 | Pickering | 705/40 |
| 5,684,965 | A | * | 11/1997 | Pickering | 705/34 |
| 5,920,847 | A | | 7/1999 | Kolling et al. | |
| 5,943,656 | A | * | 8/1999 | Crooks et al. | 705/30 |
| 5,978,780 | A | * | 11/1999 | Watson | 705/40 |
| 6,035,285 | A | * | 3/2000 | Schlect et al. | 705/30 |
| 6,052,671 | A | * | 4/2000 | Crooks et al. | 705/34 |
| 6,119,106 | A | * | 9/2000 | Mersky et al. | 705/40 |
| 6,224,108 | B1 | | 5/2001 | Klure | |
| 6,334,116 | B1 | * | 12/2001 | Ganesan et al. | 705/34 |
| 6,493,685 | B1 | * | 12/2002 | Ensel et al. | 705/40 |
| 6,968,319 | B1 | * | 11/2005 | Remington et al. | 705/40 |
| 7,536,336 | B1 | * | 5/2009 | Guinan | 705/37 |
| 2001/0032182 | A1 | | 10/2001 | Kumar et al. | |
| 2003/0191711 | A1 | | 10/2003 | Jamison et al. | |
| 2004/0167823 | A1 | * | 8/2004 | Neely et al. | 705/26 |
| 2005/0017502 | A1 | | 1/2005 | Chariker | |
| 2005/0075941 | A1 | * | 4/2005 | Jetter et al. | 705/26 |
| 2005/0137978 | A1 | * | 6/2005 | Ganesan et al. | 705/40 |
| 2007/0063021 | A1 | | 3/2007 | Chakiris et al. | |
| 2007/0063052 | A1 | | 3/2007 | Chakiris et al. | |

* cited by examiner

*Primary Examiner* — Fateh M Obaid

(74) *Attorney, Agent, or Firm* — Kilpatrick Townsend & Stockton, LLP

(57) ABSTRACT

Tools for providing bill aggregation and/or payment services. In an aspect, such tools aggregate all payments over a given period of time, allowing a user to make a single payment to ensure that all appropriate bills are paid in timely fashion. In another aspect, the tools determine, without requiring user input, an amount due on each bill, as well, in some cases, of a due date for each payment. Optionally, the tools can provide a consolidated statement to inform the user of payments to be made over a given period. Such statements can provide a varying level of detail, depending on the implementation and/or on user preferences. In some cases, a consolidated statement might provide line items and/or detailed support for each payment to be made. In other cases, the consolidated statement might simply provide a single consolidated payment amount.

12 Claims, 4 Drawing Sheets

BILL PAYMENT AGGREGATION SERVICE

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD OF THE INVENTION

The present invention relates to financial transactions in general and, more particularly, to tools for providing bill aggregation and/or payment services.

BACKGROUND

Paying bills, for many individuals and organizations, is a significant inconvenience and source of stress. Most people spend an inordinate amount of time attempting to keep track of bills, payment amounts and/or due dates, not to mention the inconvenience of writing and mailing checks. Moreover, if a payment is overlooked or forgotten, that oversight can have a significant negative affect on an individual's (or organization's) credit rating, and/or can result in the interruption of an important service, repossession of a vehicle, etc. Moreover, the payment of bills results in non-trivial time and expense in many cases (due to, for example, the cost of envelopes, postage, penalties for late payments, etc.).

Some banks and other financial institutions have attempted to address this problem by providing online bill payment services for accountholders. These services, while perhaps avoiding some of the inconvenience of bill payment, do not address all of the problems with bill payment. For instance, with some banks payments generally must be scheduled individually by the accountholder, raising the same issues of possible missed payments, inconvenience in tracking amounts due and/or due dates, etc. Moreover, such online bill payment services generally are unavailable to those who do not hold an account at a bank offering such services.

Hence, there is a need for more robust bill payment services.

BRIEF SUMMARY

Embodiments of the invention provide novel tools (including, without limitation, systems, methods and software) for providing bill aggregation and/or payment services. In an aspect, such tools might aggregate all payments over a given period of time, allowing a user to make a single payment to ensure that all appropriate bills and/or invoices (each a "bill") are paid in timely fashion. In another aspect, some embodiments determine, without requiring user input, an amount due on each bill, as well, in some cases, of a due date for each payment. Beneficially, such embodiments allow a user to avoid the traditional hassle and stress of tracking and paying bills.

Optionally, certain embodiments might provide a consolidated statement (e.g., on a periodic basis) to inform the user of payments to be made and/or that have been made (e.g., post-payment reporting of automatic payments or history of payments made) over a given period. Such statements can provide a varying level of detail, depending on the implementation and/or on user preferences. Merely by way of example, in some cases, a consolidated statement might provide line items for each payment to be made, including, without limitation, a payment amount, a billing entity to which the payment will be made, a payment due date, and/or the like. A consolidated statement may also provide detail behind each line item or service bundle by including the detail directly on or with the consolidated statement, by linking to a website maintained by or for the biller and/or the bill aggregator, or by including the detail as an object or objects with the consolidated statement (e.g., embedded in a consolidated statement sent via e-mail). Various security measures may be employed for a user to retrieve the detail, including without limitation, user names, passwords, biometrics (e.g., fingerprint, retinal scan, voiceprint, DNA, etc.), and/or encryption of any or all of the foregoing.

The tools provided by various embodiments of the invention include, without limitation, methods, systems, and/or software products. Mainly by way of example, a method might comprise one or more procedures, any or all of which are executed by a computer system. Correspondingly, an embodiment might comprise a computer system (such as a host computer) configured with instructions to perform one or more procedures in accordance with methods of the invention. Similarly, a computer program might comprise a set of instructions that are executable by a computer system (and/or a processor therein) to perform such operations. In many cases, such software programs are encoded on physical and/or tangible computer readable media (such as, merely by way of example, optical media, magnetic media, and/or the like).

A method of providing bill payment services for a user, in accordance with one set of embodiments, comprises receiving at a computer (such as a host computer) identification of a plurality of billing entities (e.g., a first billing entity and a second billing entity) for which bills should be consolidated. The host computer, in an aspect, may be operated by a bill aggregator. A bill aggregator might also provide financial services such as money transmission or banking services. The method, in some embodiments, further comprises receiving, at the computer, a first set of billing information for the first billing entity and a second set of billing information for the second billing entity. Each set of billing information might comprise a billing identifier that identifies the user to the respective billing entity.

In some embodiments, the method comprises notifying each of the billing entities that the bill aggregator should be a recipient of bills from that billing entity. Hence, the method might also comprise receiving, from the first billing entity, notification of a first amount due to the first billing entity; the first amount due, in an aspect, corresponds to the first billing identifier and/or has a first due date. Similarly, the method might further comprise receiving, from the second billing entity, notification of a second amount due to the second billing entity; the second amount due might correspond to the second billing identifier and/or have a second due date.

According to an embodiment, the method further comprises providing a consolidated statement to the user. This consolidated statement might provide a payment notification to the user (e.g., a notification of the first amount due, a notification of the second amount due, and/or a notification of a consolidated amount due comprising the sum of the first and second amounts due). The method might further include receiving, at the computer, confirmation from the user that at least a portion of the consolidated statement (e.g., at least a portion of one or more of the amounts due) should be paid, and/or receiving from the user (e.g., via a money transfer transaction) funds sufficient to pay at least a portion of the first amount due and/or the second amount due.

In some aspects, the method further comprises paying at least a portion of the amounts due. Merely by way of example, the method might comprise transferring, (e.g., via a first host-to-host transfer on or shortly before—for example, within a few days of—the first due date), a first amount of funds to a first financial institution associated with the first billing entity. This first amount of funds corresponds, in an aspect, to the first amount due. Similarly, the method might comprise transferring (e.g., via a second host-to-host transaction on or shortly before the second due date) a second amount of funds to a second financial institution associated with the second billing entity; the second amount of funds might correspond to the second amount due. A billing entity may also receive a negotiable instrument (e.g., sent via postal mail, overnight courier, etc.) and/or may receive a negotiable instrument via a printer in communication with a host computer.

A method in accordance with another set of embodiments comprises receiving at a computer (such as a host computer) identification of a plurality of billing entities (e.g., a first billing entity and a second billing entity) for which bills should be consolidated. The method, in some embodiments, further comprises receiving, at the computer, a first set of billing information for the first billing entity and a second set of billing information for the second billing entity. The first set of billing information might comprise a first billing identifier for the user, while the second set of billing information might comprise a second billing identifier for the user.

The method might further comprise determining (perhaps without requiring any input from the user) a first amount due to the first billing entity (corresponding to the first billing identifier) and/or a second amount due to the second billing entity (corresponding to the second billing identifier). In some cases, the method comprises receiving funds from the user and/or paying (e.g., from the host computer) funds sufficient to satisfy at least a portion of at least one of the amounts due.

As noted above, other embodiments provide systems, including without limitation systems for providing payment aggregation services. An exemplary system in accordance with one set of embodiments comprises a processor, a communication interface in communication with the processor, and a computer readable medium in communication with the processor. The computer readable medium, in an aspect, has encoded thereon a computer program comprising a set of instructions executable by the processor to cause the computer system to perform one or more operations.

In one set of embodiments, the set of instructions comprises instructions for receiving, via the communication interface, identification of a plurality of billing entities (which might include, for example, a first billing entity and/or a second billing entity) for which bills should be consolidated. The set of instructions might further comprise instructions for receiving a first set of billing information (which might comprise a first billing identifier) for the first billing entity, and/or a second set of billing information (which might comprise a second billing identifier) for the second billing entity.

There might be further instructions for determining a first amount due to the first billing entity and/or corresponding to the first billing identifier, and/or instructions for determining a second amount due to the second billing entity and/or corresponding to the second billing identifier. In an aspect, the set of instructions further comprises instructions for receiving funds from the user and/or instructions for paying funds sufficient to satisfy at least a portion of at least one of the amounts due.

In some embodiments, the communication interface comprises a web server interface (which might be provided by a web server integrated with the computer system and/or a web server separate from the computer system). Various communications with the user might be supported by the web server interface. Merely by way of example, the instructions for receiving identification of billing entities might comprise instructions for receiving the identification via the web server interface. As another example, the instructions for receiving funds from the user might comprise instructions for receiving, via the web server interface, information from the user regarding a source of the funds (e.g., wire transfer or money transfer instructions, identification of a financial institution, a routing number, an account number, an authorization to initiate one or more ACH credits, electronic check information, amount of funds to withdraw, credit card or account information, debit card or account information, stored value card or account information, etc.)

In other embodiments, the communication interface might comprise an interface providing communication via one or more communication devices, which can include, inter alia, a user kiosk, an automated teller machine, an agent terminal, a telephone, a telephonic voice response unit, etc. Communication to/from the user can take place via such devices as well. In a particular embodiment, the communication interface might provide communication with a user's mobile device.

The communication interface might also support communication with financial institutions and/or financial networks. Merely by way of example, in some embodiments, the communication interface might comprise a host-to-host interface (in one such embodiment, funds may be transferred to a billing entity—and/or a financial institution associated therewith—using the host-to-host interface). In other embodiments, the communication interface might comprise card association networks, such as MasterCard or Visa, or debit networks, such as Star, NYCE, Pulse, Maestro and Interlink. In yet other embodiments, the communication interface might comprise an interface for providing communication with an automated clearinghouse, such that funds may be transferred via a transaction using the automated clearinghouse.

Another set of embodiments provides computer programs. Merely by way of example, in one embodiment, a computer readable medium might have encoded thereon a computer program comprising a set of instructions executable by a computer system to perform one or more operations. The set of instructions might, in some embodiments, include instructions similar to those described above.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral to denote one of multiple similar components. When reference is made to a reference numeral without specification to an existing sublabel, it is intended to refer to all such multiple similar components.

DETAILED DESCRIPTION

Figure 1:
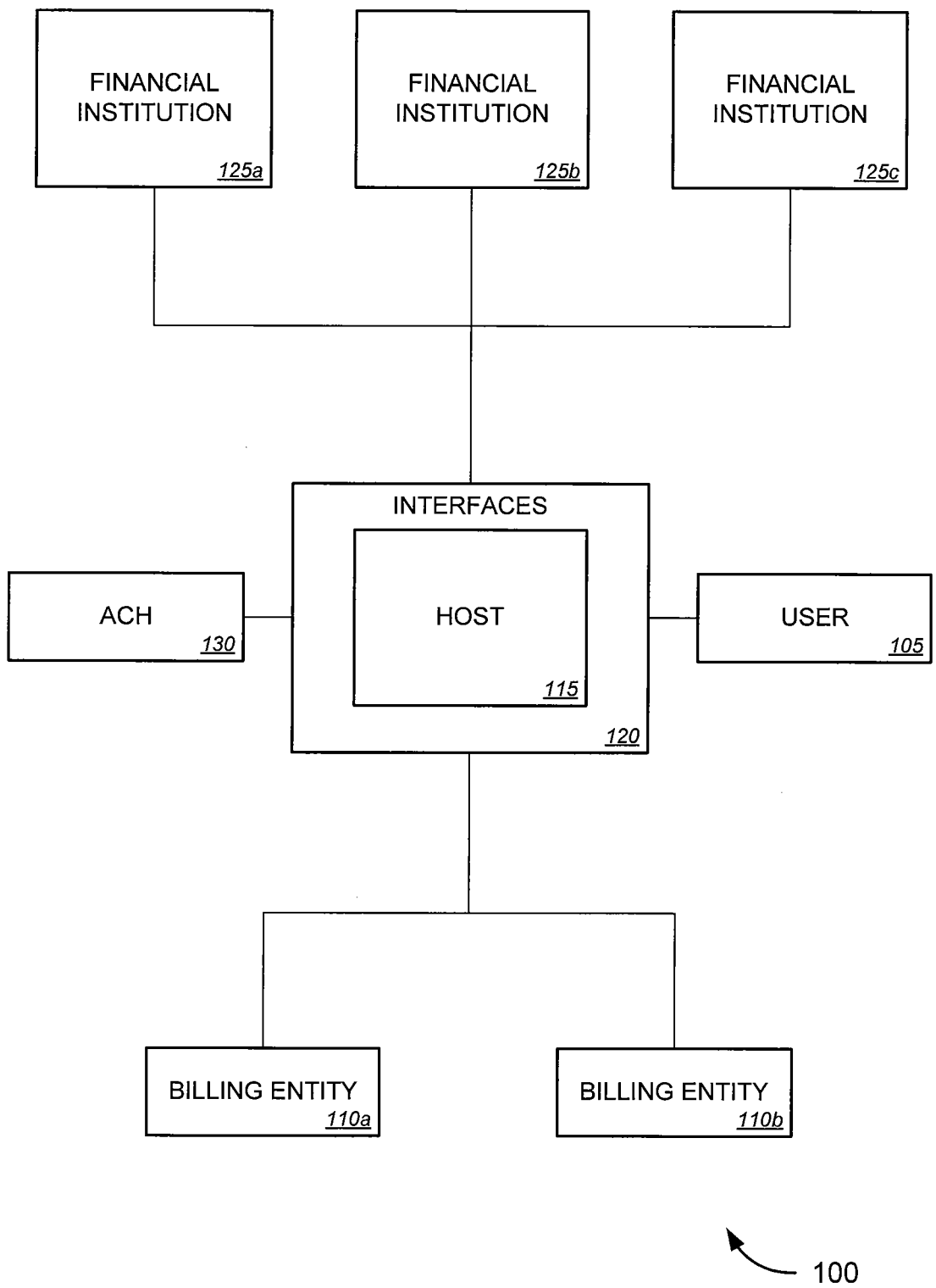
FIG. 1 is a block diagram illustrating relationships between various parties to a bill aggregation and payment service, in accordance with various embodiments of the invention.

While various aspects of the invention have been summarized above, certain exemplary embodiments of the invention are described in further detail below. It should be noted that the embodiments discussed herein are intended only to be exemplary and are provided for illustrative purposes, and that they are not intended, nor should they be interpreted, to be exhaustive or limiting descriptions of the invention. While various embodiments are described herein, one skilled in the art should appreciate that various components, processes and/or features described with respect to one embodiment easily can be incorporated within other embodiments. Similarly, while various alternatives and/or optional components, processes and/or features may be described, it should be understood that the invention can, in various embodiments, omit, substitute and/or re-order such components, processes and/or features as appropriate.

In an aspect, certain embodiments of the invention include systems for providing payment aggregation services. As used herein, the terms "payment aggregation" and "bill aggregation" are used broadly to describe any service by which a user is enabled to make a single payment to a bill aggregator, who then makes one or more payments to one or more billing entities on behalf of the user. Embodiments of the invention, inter alia, can allow a service provider (referred to herein as a "bill aggregator") to track and/or pay bills on behalf of a customer (referred to herein as a "user") of the service. In a novel aspect of some embodiments, the bill aggregator receives bills on behalf of the user and pays those bills, optionally after receiving confirmation from the user. In some such embodiments, the user is not required to inform the bill aggregator of specific bills to be paid. Instead, the user registers for the service and/or informs the bill aggregator of the organizations for which the user would like bills to be paid (referred to herein as "billing entities"), and the bill aggregator takes care of determining the amount to be paid, the due date, etc., and of paying the bills. (Optionally, the user may be asked to confirm the amounts to be paid.) Conveniently, rather than having to track and pay multiple bills each month (or other period), the user need interact only with the bill aggregator, saving the user significant time and/or expense.

In accordance with various embodiments of the invention, the user might be a person, a corporation, and/or any type of entity that needs to pay bills. (In many cases, the bills will be paid on a recurring basis, although the amount of each bill need not necessarily be constant.) A billing entity can be any person, business and/or organization that normally would submit bills, invoices, etc. to the user for payment (or to whom the user would otherwise be expected to make payment). Examples of billing entities include, without limitation, public utilities, telecommunications providers, lenders (or other credit-extending organizations, which can include without limitation, mortgagees, auto lenders, educational lenders, personal lenders, etc.), charitable organizations, religious institutions, escrow companies, merchants (including without limitation merchants who receive payments on layaway items, etc.), financial institutions (which might receive payments for retirement accounts, savings accounts, educational savings accounts, brokerage accounts, etc.), and/or the like.

A bill aggregator can be any entity that provides some or all of the facilities described herein for providing payment aggregation services. Such payment aggregation services might be provided by a stand-alone entity (and in particular, an entity that is not a financial institution such as a depository bank); in other cases, they might be provided by a registered money transfer service (of which Western Union Financial Services, Inc. is one example), by a bank or other financial institution, by an online service provider, by a credit bureau, by a communications provider and/or by any of a variety of other businesses. Beneficially, in accordance with some embodiments of the invention, the bill aggregator can provide payment and/or bill aggregation services for a user, even if the user does not maintain a deposit account (such as a checking account, savings account, money market account, etc.) with the bill aggregator. For example, in some instances, the bill aggregator might offer deposit account services with bill aggregation features but might also offer those features as a standalone service without requiring the user to maintain a deposit account. As another example, the bill aggregator might not even be a financial institution capable of providing deposit account services. In some instances, a user who does not have a deposit account or other financial account can use payment aggregation services (e.g., funding payments by taking cash to a retail location, via a money transfer transaction, and/or the like).

Figure 3:
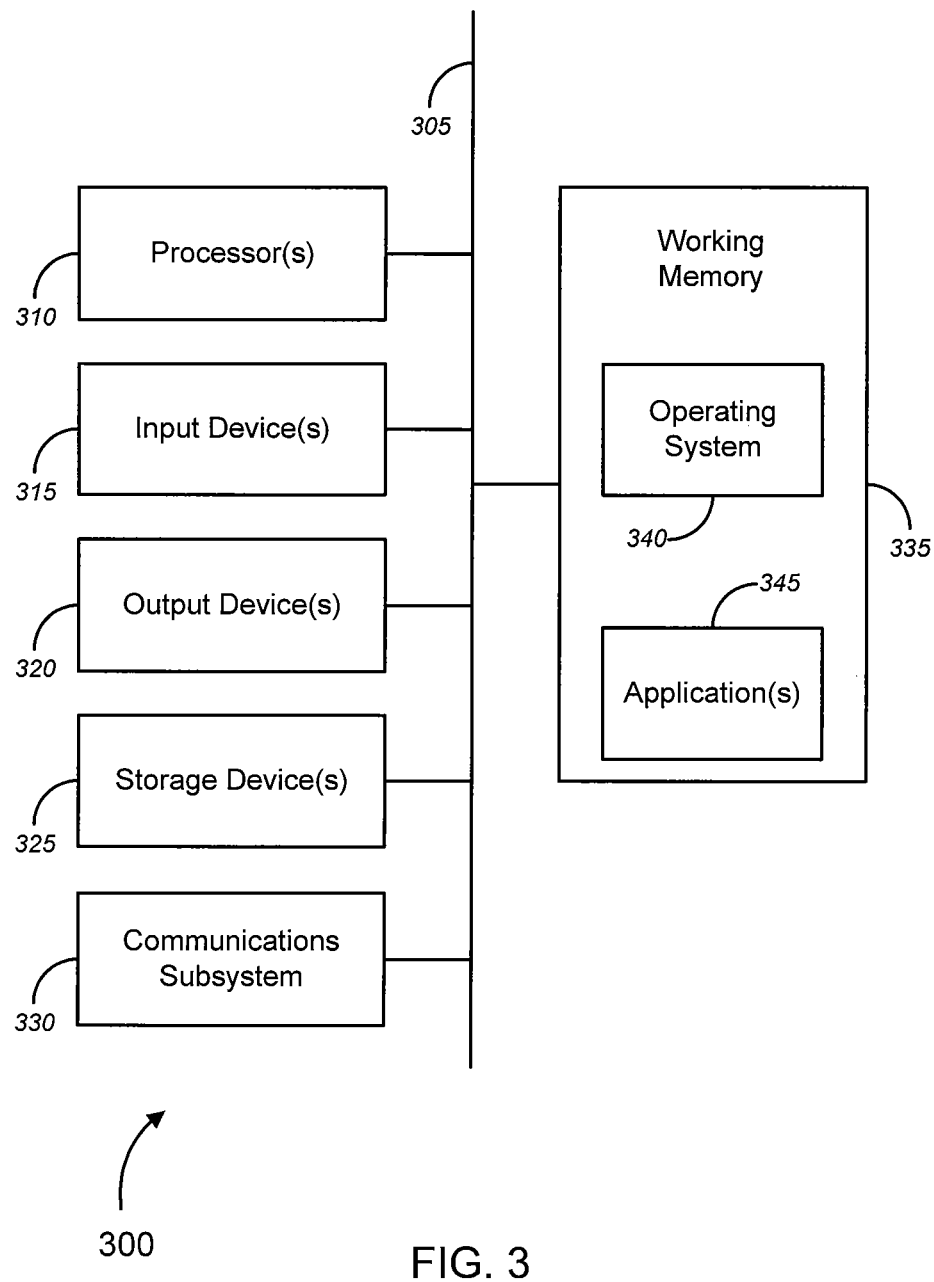
FIG. 3 is a generalized schematic diagram of a computer system that can be used in accordance with various embodiments of the invention.
Figure 4:
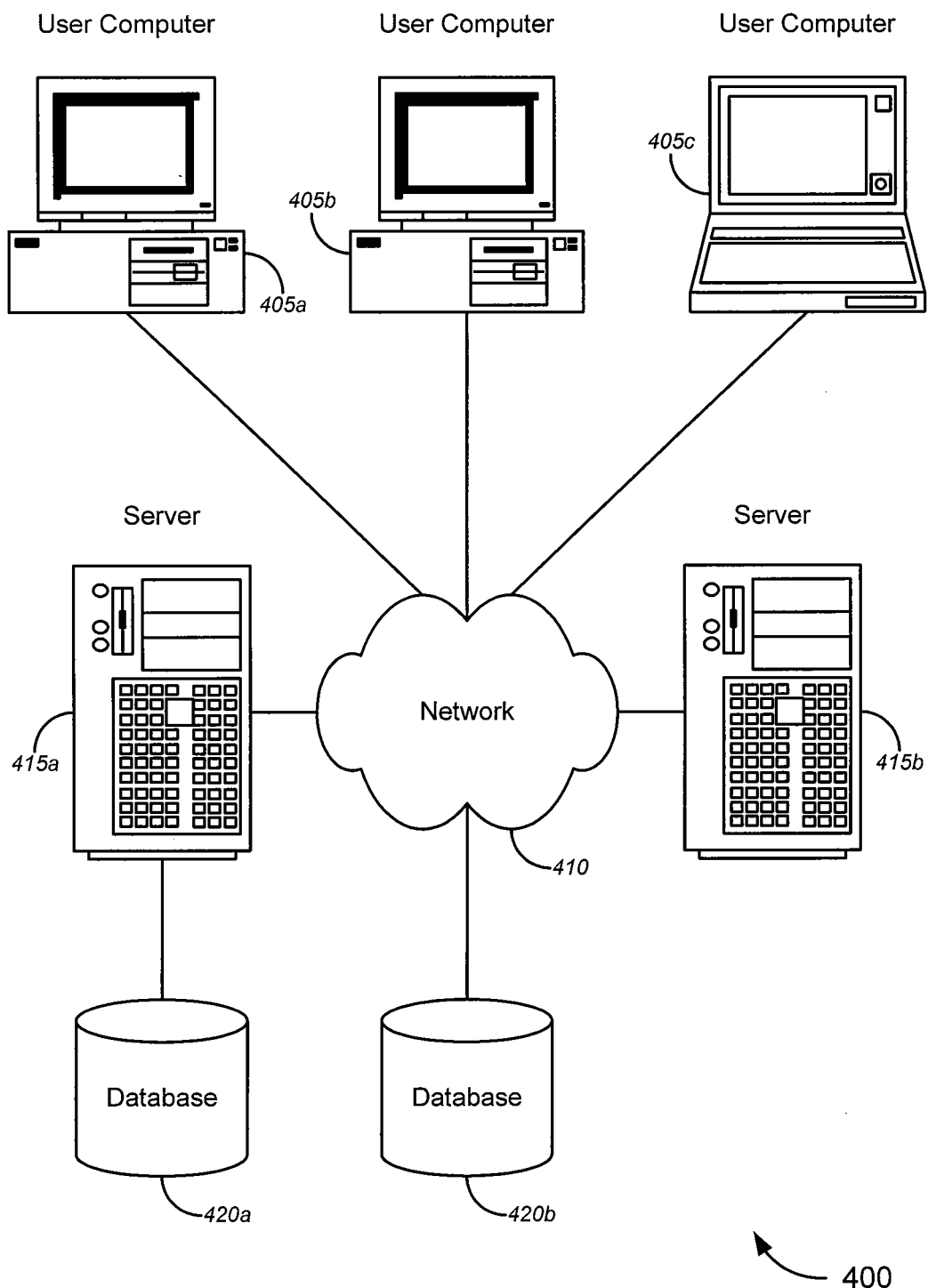
FIG. 4 is a generalized schematic diagram of a networked system of computers that can be used in accordance with various embodiments of the invention.

FIG. 1 illustrates an exemplary relationship 100 between a user 105 and one or more billing entities 110. The relationship is facilitated by a host computer 115, which performs one or more operations for providing payment aggregation services, for example as described in further detail below. In an aspect, the host computer 115 is operated by (and/or serves as) a bill aggregator. As used herein, the term "host computer" means any computer (or system of computers) that can be used to process transactions in accordance with embodiments of the invention. One skilled in the art will appreciate, based on the disclosure herein, that a variety of configurations are possible. Merely by way of example, in some embodiments, a host computer 115 might comprise one or more mainframe computers, minicomputers, server computers, and/or the like. FIGS. 3 and 4, described below, illustrate various exemplary arrangements that can be used for host computers (and other computers), in accordance with embodiments of the invention.

The host computer 115 includes one or more interfaces 120 that provide communication between the host computer 115, and various other parties involved in the bill aggregation and/or payment services of the invention. As used herein, the term "communication interface" means any hardware or software (or combination thereof) that enables and/or facilitates communication between the host computer 115 and other participants in the embodiments of the invention (including, without limitation, the user 105, the billing entities 110, various financial institutions 125, one or more automated clearinghouses ("ACH") 130, card associations, debit networks and/or the like). As described in further detail below, the host computer 115 communicates with these participants in a variety of contexts (including, without limitation, receiving and/or transmitting various notifications, confirmations and/or other information), receiving funds, making payments, etc. In specific embodiments, one or more of the communication interfaces 120 are used to provide and/or facilitate such communications.

In some cases, a communication interface 120 will provide direct communication between the host 115 and another participant (e.g., via data transfer interfaces—such as XML, transaction records and/or the like—and/or application program interfaces ("API"), etc). Such interfaces can include, without limitation, a host-to-host interface for communication with a host computer at a financial institution 125, an interface for communication with an ACH, etc. In other cases, a communication interface 120 might include, and/or provide communication with, a separate communication device (not shown on FIG. 1), such as a wireless gateway, a web server or e-mail server, a user kiosk (which can provide, for example, a computer or terminal, which is in communication with the host 115, in a walk-up environment such as a mall, bank, etc.), an agent terminal (which can include, but is not limited to, a point of sale ("POS") device, cash register, etc.), a user's computer (referred to herein as a "user computer"), a telephone interface (which might provide communication with either a live operator or a voice recognition unit ("VRU"), which can be interactive or non-interactive), a printer (including without limitation a standard printer, a printer configured to print negotiable instruments and/or using magnetic ink, etc.), a device configured to communicate with a mobile telephone/device (e.g., via a dedicated application or applet, short message service ("SMS") messages, text messages, wireless access protocol ("WAP") communications, etc.). In some cases, the communication interface 120 includes (or provides communication with) a web server, which can be used to create web pages for communicating with a user computer. In this way (among others), the host computer 115 can provide notifications to the user 105, receive confirmations, funds, and other communications from the user 105, etc. Communications may be encrypted using any number of encryption methodologies known to those skilled in the art.

One possible mode of operation of the host computer 115 is described in further detail with respect to FIG. 2 below. In a general sense, however, the host computer 115 is configured (e.g., via a computer program comprising instructions executable by the host computer 115) to provide payment aggregation services for the user 105. In this general sense, the user 105 identifies for the host computer 115 one or more billing entities 110 for which the user 105 would like to have payments made by the bill aggregator. The host computer 115 obtains information about payments due to those billing entities 110 (e.g., by requesting that the billing entities 110 notify the bill aggregator about payments due) and makes the payments on behalf of the user 105, providing the user 105 with enhanced convenience. In an aspect, service provided by embodiments of the invention is used for repeating payments, so that the user 105 does not need to keep track of monthly (or other periodic) bills from the billing entities 110. Instead, the amount(s) due and due date(s) are tracked automatically by the host computer 115, which (generally periodically) receives funds from the user 105 and/or on behalf of the user 105 (e.g., from a trust fund, education IRA, 529 plan, 401(k) plan, social security (retirement and/or disability) disbursement, Medicare disbursement, Medicaid disbursement, etc.) and distributes the appropriate amount of funds to each billing entity 110.

In an aspect, the host computer 115 is configured to interact with one or more financial institutions 125 and/or transaction networks (such as an ACH 130, card association networks, debit networks, etc.) to obtain funds from the user 105 and/or distribute funds to billing entities 110. Merely by way of example, the user 105 might authorize the host computer 115 to withdraw funds from the user's account at a first financial institution 125a. Correspondingly, the host computer 115 might be configured to deposit and/or transfer funds into an account (perhaps at a second financial institution 125b) for one of the billing entities 110a. In some cases, a transaction network (such as an ACH 130, card association networks, debit networks, etc.) might be used to facilitate such a transfer, although this is not required. As described in more detail below, other procedures for receiving funds from the user 105 and/or distributing funds to the billing entities 110 can be used as well.

Figure 2:
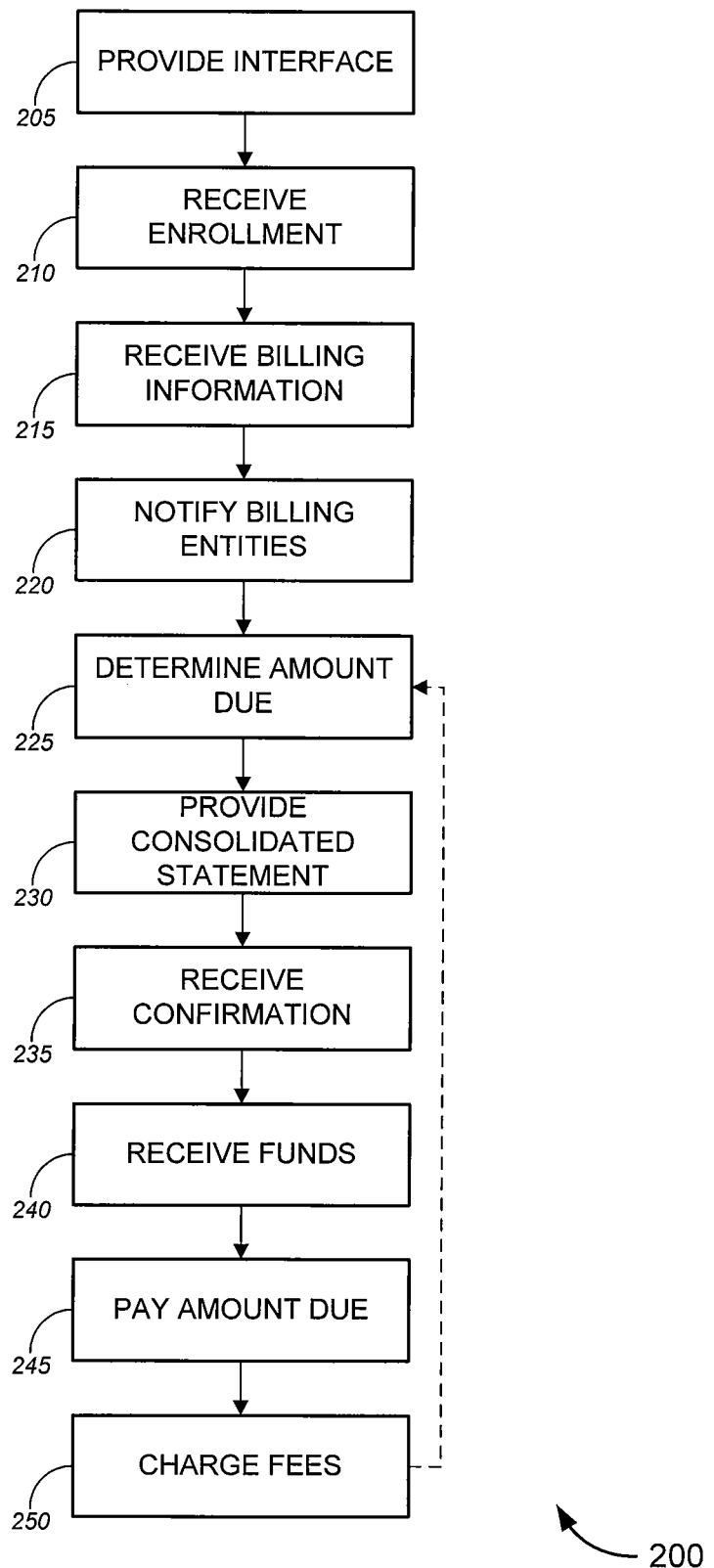
FIG. 2 is flow diagram illustrating a method of providing payment aggregation services, in accordance with various embodiments of the invention.

Turning to FIG. 2, a method 200 of providing payment aggregation services will now be described. As noted above, the method 200 (and/or portions thereof) can be implemented by a system such as the system 100 of FIG. 1 (and, specifically, by the host computer 115), and the method 200 accordingly is described by reference to the system 100 described above. It should be appreciated, however, that the method 200 (and similar methods) could be implemented using different components than those illustrated by FIG. 1, and that the components of FIG. 1 could operate in accordance with methods other than the method 200 of FIG. 2.

The method 200 comprises providing an interface (such as a communication interface 120) for interaction between the user 105 and the host computer 115 (block 205). In some cases, the host computer 115 will comprise the interface (such as in the case of an API, a web server program operating on the host computer 115, etc.), while in other cases, the interface might be a separate device (e.g., a web server, an e-mail server, a VRU, an agent terminal, a kiosk, an automated teller machine, a mobile device, etc.) in communication with the computer. Several examples of such interfaces are described above. Providing an interface can comprise any one or more of several operations, including coupling an interface to a host computer 115 (and/or integrating an interface with a host computer 115), providing and/or executing instructions for communicating (e.g., transmitting and/or receiving data) via the interface, allowing a user 105 to access the host computer 115 via the interface, and/or the like.

At block 210, the host computer 115 performs an enrollment transaction (and/or otherwise receives enrollment information) for the user 105. In an aspect, the enrollment transaction is performed (and/or the enrollment information is received) via an interface, such as the interfaces 120 described above. Merely by way of example, an enrollment transaction might be performed by providing a web-based form for a user 105 to provide information, and then receiving that information via a web server interface. As another example, enrollment information can be received by telephone (e.g., via a VRU, a live operator, etc.), via a paper form (which might be input into the host computer 115 by an agent hand-keying the information, by scanning the paper form, reading a paper form with optical character recognition technology, etc.), through e-mail or text message, and/or via kiosk or ATM.

In an aspect, performing the enrollment transaction comprises receiving (e.g., from the user 105) identification of one or more billing entities 110 for which the payment aggregation services of the invention should be performed (i.e., for which bills should be consolidated). The enrollment transaction might comprise additional information as well, including without limitation biographical information about the user 105, information identifying one or more accounts (e.g., at a bank or other financial institution 125*a*) from which funds should be obtained to make payments, and/or the like. Performing the enrollment transaction might also entail capturing biometric information (e.g., fingerprint, voice print, eye scan, etc.) from the user. Performing the enrollment transaction might also include checking user-provided information such as driver's license or other government-issued identification, passport, birth certificate, etc. In an aspect, performing the enrollment transaction might also comprise receiving any necessary authorizations from the user 105 (including without limitation, authorizations to electronically withdraw/deduct funds from an identified account, authorizations to receive bills from identified billing entities 110, authorizations to hold funds in trust and/or in escrow until bills are paid, authorizations for payroll deductions, authorizations for direct deposit to a bill payment aggregation account, and/or the like).

It should be noted that, while the transfer of such information generally is described herein with respect to an enrollment transaction, such information can be provided by the user 105, and/or received by the host 115, at any appropriate time. Merely by way of example, a user 105 might wish to add additional billing entities 110 to the service at some point after enrolling; in such a situation, the user 105 could be provided with an interface to provide such information, in a manner similar to that described with respect to the enrollment transaction. Similarly, at some point, the user 105 might want to change the financial institution, account and/or other source from which funds are to be obtained, and the host 105 therefore might be configured to receive such information at any appropriate time from the user 105.

The method 200 further comprises receiving (e.g., at the host computer 115) billing information for the billing entities 110 (block 210). This billing information may be provided by the user 105, either as part of an enrollment transaction or separate from the enrollment transaction. In other cases, the information might be received from another source, such as from the billing entities 110 themselves. (Merely by way of example, in some cases, an identification of a billing entity 110 provides sufficient information to allow the bill aggregator to obtain other billing information, such as by contacting the billing entity 110 directly.) Billing information can include, without information, payment details (such as an address to which checks should be sent, an account number and/or routing number for direct deposit, ACH transfers, etc.), information on billing frequency, information on billing amount (including, merely by way of example, whether or not the amount is fixed, at least in the near term, or variable) and/or the like. In one aspect, billing information might simply comprise an identification of the billing entity 110.

In the illustrated embodiment, the method 200 includes notifying the billing entities 110 that the bill aggregator should be a recipient of bills from the billing entities 110 (block 220). In an aspect, the bill aggregator (and/or, more precisely, the host computer 115) might perform this notification. In other cases, the user 105 might perform the notification. In particular embodiments, the bill aggregator might obtain authorization from the user 105 (e.g., during the enrollment transaction, as described above) to perform this notification, and/or might notify the appropriate billing entity 110 of this authorization. Hence, for example, if the user 105 has requested bill payment services for two billing entities 110, the host computer 115 (and/or the bill aggregator) might send a first notification to the first billing entity 110*a* and a second notification to the second billing entity 110*b*. (As noted above, any number of billing entities 110 can be supported by embodiments of the invention.)

The notification can be performed in a variety of ways. Merely by way of example, the notification might comprise an authorization (which might be signed and/or otherwise verified by the user 105, either on paper or via an electronic signature, a checked box or otherwise) provided by the user 105 (either directly to the billing entity 110 or indirectly through the host computer 115). Additionally and/or alternatively, the notification might comprise a communication from the host computer 115 to the billing entity 110 (e.g., via an interface 120, etc.). It should be appreciated that the type of notification used often will depend on the requirements of the billing entity 110 (and/or any governing statutory and/or regulatory scheme), and that, because embodiments of the invention can support a wide variety of billing entities 110, a correspondingly wide variety of notification schemes might be employed. The notification can be in paper or electronic form.

In many cases, the bill payment services of the invention are used to make a number of payments to each billing entity 110 over time. Advantageously, embodiments of the invention do not require the payments to be a constant amount. Because the amount due to a billing entity 110 in a first period might be different from an amount due in a second period, embodiments of the invention can be configured to determine an amount due and/or due date each time a payment is to be made. (Of course, constant periodic payments can be supported as well.)

At block 225, therefore, the host computer 115 determines an amount due to each of the billing entities 110 and/or a due date for each amount due. In one aspect, the host computer 115 determines the amount due (and/or due date) without requiring any input from the user 105. Beneficially, this relieves the user 105 from having to undertake the inconvenience of notifying the host computer 115 about bills each month. (In another aspect, however, the invention can allow the user 105 to indicate to the host computer 115—e.g., via an interface 120—an amount due and/or due date, if desired.)

There are several ways in which the host computer 115 can determine an amount due without requiring input from the user 105. In some cases, for example, the host computer 115 will receive, from a billing entity 110 a notification of an amount due and/or a due date (e.g., a bill or other notification), either electronically and/or on paper, and the amount due can be determined from this notification. The notification may consist of the entire bill or may comprise only certain components of the bill (e.g., amount due and/or due date. The amount due generally will correspond to a particular billing entity 110, and also will include a billing identifier (such as an account number, etc.) for the user 105, as well as a due date, any or all of which may be provided on the notification of the amount due. In the case of electronic billing, the host computer 115 might receive data, e.g., via an interface 120, that allows the host computer 115 to automatically determine the amount due, due date, associated billing identifier, etc. In other cases, an agent or operator, or the user 105, might input the amount due and/or due date into the host computer 125, the bill might be scanned and/or parsed to find an amount and/or date due, etc. In many cases, each billing entity 110 will send a bill or other notification to the bill aggregator/host computer 115. Hence, in an aspect, the method 200 might comprise receiving, from a first billing entity 110*a*, notification of a first amount due, receiving, from a second billing entity 110*b*, notification of a second amount due, etc. (The amounts due to the various billing entities 110 need not have the same due date.) For amounts due with different due dates, embodiments might provide various means for synchronizing due dates so that a user can make a single payment for all amounts due in any given period. For example, the bill aggregator may reach agreement with each billing entity 110 that all amounts due will share a common due date. In cases where a common due date cannot be agreed upon, the user 105 can send a single aggregated payment to cover all bills that are expected to become due within a given period. If exact amounts are known, those amounts can be included in the single aggregated payment. If exact amounts are not known, amounts to be included in the single aggregated payment can be estimated, either by the billing entity 110 (e.g., based on actual and/or anticipated usage or volume) or by the bill aggregator (e.g., based on a weighted average over a specified period of time or based on an amount with at least one common factor such as a particular month in the prior year). Where amounts due are estimated, amounts received from the user 105 prior to the due dates can be held in trust or escrow until paid by the bill aggregator. For amounts that are estimated, a true-up can occur at a later date (e.g., after actual amounts are known) and may be reflected in later bill aggregation or separately received from or refunded to the user 105. In some cases, rather than collecting funds prior to the due dates, the bill aggregator can advance funds to cover payment of amounts due and then receive funds from the user 105 on or after the due dates of all or a portion of the bills.

In some cases, the host computer 115 provides notification to the user 105 of an amount due to each of the billing entities 110 (either individually or collectively). In most cases, this notification will encompass a particular period (e.g., a particular month) in which bills (or other payments) are due—hence, if the host computer 115 receives notification from three billing entities 110 that bills are due within a given month, the notification to the user 105 might comprise notification of all three of these amounts due. If a fourth billing entity 110 is owed a payment the next month, the host computer 115 might wait until the next month to provide notification to the user 105 (or, the host computer 115 might provide notification to the user 105 ahead of time—the behavior of the host computer 115 in this respect can be configurable, depending on the needs of the bill aggregator and/or the user 105). In some cases, the notification to the user 105 might be configured to allow the user 105 to take advantage of any early-payment discounts, etc., by informing the user 105 of this fact (assuming the bill aggregator is aware of this fact, based, for example, on information on a bill received from the relevant billing entity 110).

The notification to the user 105 may comprise providing a consolidated statement to the user 105 (block 230) (again, perhaps on a periodic basis), informing the user 105 of the payments that will be made and/or the amount of funds required from the user 105. (In other cases, the host computer 115 might obtain funds and/or make payments without any interaction with the user 105, perhaps depending on the preferences of the user 105.) If a consolidated statement is provided, the consolidated statement might itemize the payments to be made over a given period (e.g., identifying the billing entity 110, amount due, due date, etc. for each payment), while in other cases, the consolidated statement might simply notify the user 105 of the total amount to be paid. Hence, in an aspect, the consolidated statement provides a payment notification to the user 105—this payment notification might provide notification of a first amount due to a first billing entity 110*a*, a second amount due to a second billing entity 110*b*, etc., and/or a notification of a consolidated amount due (which might comprise the sum of the first amount due, the second amount due, etc.) Any number of varying levels of detail might be provided in the consolidated statement, and/or the user 105 may be given the option to select the level of detail desired in the consolidated statement. In some cases, the consolidated statement may allow the user 105 to see the detail (e.g., the entire bill) supporting an amount due from any billing entity. A consolidated statement may also provide detail behind each line item or service bundle by including the detail directly on or with the consolidated statement, by linking to a website maintained by or for the biller and/or the bill aggregator, or by including the detail as an object or objects with the consolidated statement (e.g., embedded in a consolidated statement sent via e-mail). Various security measures may be employed for a user to retrieve the detail, including without limitation, user names, passwords, biometrics (e.g., fingerprint, retinal scan, voiceprint, DNA, etc.), and/or encryption of any or all of the foregoing.

The consolidated statement may be provided using any of several techniques, including without limitation by email message, text message, by phone call (e.g., a call from a live operator, from a VRU, a prerecorded or automated voice message, etc.), by web page, by paper (e.g., mail, courier or facsimile), at a kiosk, at an ATM machine, etc. (some of these techniques might employ one or more of the interfaces 120 described above).

Optionally, the method 200 comprises receiving (e.g., at the host computer 115) confirmation from the user 105 that at least a portion of the consolidated statement should be paid (i.e., confirmation that at least a portion of at least some of the bills/payments to which the consolidated statement pertains should be paid), and/or instructions that one or more of the payments should not be made, either in part or in whole (block 235). Merely by way of example, if the user 105 disputes an amount of a bill, the user 105 might provide instructions not to pay that bill, or to make only a partial payment (e.g., of an undisputed amount). Hence, the user 105 might be provided the option of individually approving/confirming each amount due to be paid. However, if the user 105 wants to approve all of the amounts due, the user 105 might be given the option to confirm payment of the consolidated statement (e.g., approve a consolidated payment amount), without having to individually approve payment of each amount due (e.g., each bill).

Moreover, as noted above, in some cases, the host computer 115 might be configured to make payments on schedule without any input from the user 105. In some cases, a hybrid approach might be employed, whereby the user 105 is notified of payments to be made (e.g., with a consolidated statement) and given a certain amount of time (e.g., a day, a week, etc.) in which to provide instructions not to make a particular payment. If the user 105 does not provide any instructions within that time frame, the user's lack of response might be considered to be confirmation that the entire consolidated statement (i.e., all of the amounts due for which the consolidated statement provides notification) should be paid, and the host computer 115, in such a case, would make all of the scheduled payments. A user 105 may also specify that the bill aggregator automatically pay certain bills, but obtain approval from the user 105 before paying other bills. Alternatively, the bill aggregator may make payment to each of the billing entities 110 and notify 105 the user after payment has been made.

Many of the modes of communication used to provide a consolidated statement can also be used to allow the user 105 to confirm that the statement should be paid. In fact, in one aspect, the procedures for notifying the user 105 of payments and receiving confirmation that payments should be made can be implemented in conjunction with one another. For instance, in some embodiments, if an interactive tool (e.g., a telephone interface, a mobile device, a web site, a kiosk, an ATM, etc.) is used to provide notification of payments, that same tool can be used by the user 105 to confirm (optionally at the time of notification) that some or all of the payments should be made.

Merely by way of example, in one embodiment, where a web page (comprising details about one or more amounts due) is provided to notify the user 105 of payments that should be made, the web page might implement a web-based form to both notify the user 105 of payments to be made and to receive input from the user 105 as to whether to make those payments. Hence, a web site might be configured to allow the user 105 to confirm that some of all of the payments should be made, and receiving confirmation from the user 105 therefore might comprise receiving confirmation via that web site. (Similar procedures could be implemented via a telephone VRU, via a kiosk, via an ATM, etc.).

As another example, in a set of embodiments, a wireless phone (such as a GSM phone, CDMA phone, etc.) or other wireless device (such as a wireless email device, a wireless personal digital assistant, etc.) can be used to interface with the host computer 115. In such embodiments, the user 105 might be notified of payments via the wireless phone (e.g., by communications between the host computer 115 and a web browser operating on the phone/device, by a dedicated application installed on the phone/device, via email message, text/SMS message, etc.), and/or the user 105 can confirm payments, and/or indicate that certain payments should not be made, via the wireless phone (e.g., by reply message, through fields on a web page viewed in the phone's web browser, etc.). In fact, a wireless phone could be used for some or all of the communications described herein between the host computer 115 and the user 105 (such as enrollment transactions, entry of billing information, consolidated statements, and/or the like).

Merely by way of example, in a set of embodiments, a wireless application is provided to the user 105 (e.g., by download from the bill aggregator's web site, on compact disc, etc.), and installed by or for the user 105 on a wireless phone/device. The application is configured to communicate securely and wirelessly with the host computer 115 (e.g., via IP and/or other communication protocols), using a communication interface 120 at the host computer 115 supporting such communications. The user 105 can use the application to enroll for bill aggregation service, or the user 105 can enroll using another method. The application also can allow the user 105 to provide information about billing entities 110, which is transmitted to the host computer 115. The host computer 115 pushes billing notifications to the application (and/or the application downloads notifications periodically and/or on demand from the user 105), and the application then provides notification to the user 105 and/or allows the user 105 to confirm or deny that payments should be made. In some embodiments, the application might be implemented as a compiled application and/or applet that is installed on the user's device, while in other embodiments, the application is provided through a web interface, which in some cases implements dynamic browsing technologies, such as JavaScript, AJAX, and/or the like.

It should be recognized, however, that these examples are provided merely for purposes of illustration and should not be considered limiting. As noted above, embodiments of the invention support many different communication interfaces and/or modes of communication. Further, more than one mode of communication may be employed (e.g., a user 105 may receive an e-mail or text message alerting him or her that a consolidated statement is available for review at a specified web site) in providing bill aggregation services for any particular user.

The method 200 further comprises receiving (e.g., at the bill aggregator and/or host computer 115) funds from the user 105 (block 240) sufficient to pay at least a portion of the bills (or, more precisely, to make the payments, and/or portions thereof, that the user 105 has approved, if applicable). Embodiments of the invention provide a wide variety of ways in which funds can be received. Merely by way of example, as noted above, in one embodiment, the billing aggregator (and/or host computer 115) is authorized by the user 105 to obtain (via withdrawal, electronic funds transfer, electronic check, etc.) funds from the user's account at a financial institution 125; in such embodiments, receiving funds from the user 105 might comprise performing an authorized withdrawal, etc. from the user's account. A user's account can be any account suitable for making payments, including without limitation, a bank account (e.g., checking, savings, CD, etc.), investment count, trust fund, 401(k), 529 account, Medicare account, Medicaid account, Social Security (retirement or disability) account, etc. In another embodiment, receiving funds from the user 105 might comprise receiving authorization from the user 105 (e.g., in an enrollment transaction) to draft and/or endorse negotiable instruments (such as personal checks, certified funds, bearer instruments, etc.), which might be payable on the user's account, and/or drafting one or more such negotiable instruments. In further embodiments, receiving funds might comprise processing and/or receiving funds (e.g., cash) via a money transfer transaction (e.g., using a registered money transfer service), receiving and/or processing a credit, debit, and/or ATM card (including smart cards) or account transaction, stored value card or account transaction, an account associated with a wireless device (whether a prepaid account or a credit account) and/or the like.

At block 245, the host computer 115 pays at least a portion of at least some of the amount(s) due to the billing entities 110 (in some cases, subject to any instruction from the user 105 not to pay certain bills and/or depending on whether confirmation has been received from the user 105). In some embodiments, paying an amount due comprises paying a first amount of funds to a first billing entity 110*a*, corresponding to at least a portion of a first amount due, and paying a second amount of funds to a second billing entity 110*b*, corresponding to at least a portion of a second amount due. (Any number of such payments can be accommodated.) In a particular aspect, a single amount of funds received from the user 105 can be divided to pay amounts due to any number of billing entities 110.

As with receiving funds, a number of techniques can be used to make payments. Merely by way of example, in some cases, paying an amount of funds comprises transferring an amount of funds to a financial institution 125*b* associated with the billing entity 110*a* to which payment is to be made. Such a funds transfer might comprise a host-to-host transaction from the host computer 115 to another computer associated with the financial institution 125*b*, and/or a transaction via an ACH. (The procedures for performing host-to-host transactions and ACH transactions are well-known in the financial arts.) In some cases, the transfer is performed on (or shortly before) a date on which the payment is due. In another set of embodiments, making a payment comprises performing a money transfer transaction (e.g., via a registered money transfer service), with the billing entity 110 as the payee of the money transfer transaction. In one aspect, the bill aggregator might be the payor on such a transaction, while in other cases, as described below, the user 105 might be payor. (As noted above, the bill aggregator might be a registered money transfer service, in which case the host computer 115 itself, or another similar computer operated by the bill aggregator might be capable of processing the money transfer transaction.)

Other methods of paying a billing entity 110 are possible as well. For instance, in some cases, paying an amount due comprises generating and/or endorsing a negotiable instrument in favor of the billing entity 110. The host computer 115 might also provide for the negotiable instrument to be mailed to the billing entity 110, for example, by printing and/or addressing an envelope for the negotiable instrument, etc. The negotiable instrument might be payable on an account associated with the bill aggregator. Alternatively, as described below, the negotiable instrument might be payable on an account associated with the user 105. As another option, if a billing entity 110 has the capability of printing negotiable instruments itself, making a payment might comprise simply sending, to the billing entity 110, sufficient information (e.g., routing number, account number, MICR characters, bar code, and/or amount, etc.) to allow the billing entity to print a negotiable instrument payable on the bill aggregator's (or user's) account or printing a negotiable instrument on a remote printer in communication with the host computer 115.

In some cases, receiving funds from the user 105 and paying funds to a billing entity 110 might be consolidated in a single operation (or set of operations). Merely by way of example, in some cases, receiving funds and paying a bill might collectively comprise drafting and/or generating a negotiable instrument payable on the user's account with the billing entity 110 as the payee. (In an embodiment, the host computer 115 can be configured to perform these operations.) As another example, receiving funds and paying a bill collectively might comprise transmitting to the billing entity 110 (e.g., via an interface 120) information sufficient to allow the billing entity 110 to print a negotiable instrument, drawn on the user's account, that is payable to the billing entity 110. As yet another example, receiving funds and making a payment might collectively comprise processing a money transfer transaction (e.g., as an electronic funds transfer via an ACH or as a money transfer through a registered money transfer service) from the user 105 directly to the billing entity 110.

Optionally, the method 200 might include charging one or more fees for the bill aggregation and/or payment services of the invention (block 250). Merely by way of example, the user 105 might be charged a set-up fee when enrolling with the bill payment service. Alternatively and/or additionally, the user 105 might be charged ongoing fees, for example, a periodic (e.g., monthly) fee for the service, a per-payment fee, and/or the like. In some embodiments, one or more billing entities 110 might be charged a fee (either a one-time fee or an ongoing fee, such as a periodic fee, a per-payment fee, etc.), perhaps in addition to any fees charged to the user 105. If funds are held in trust or escrow prior to paying bills, interest may be earned on the held funds by the user 105, the bill aggregator, and/or the billing entity 110. If funds are received in one currency and paid in another currency, the bill aggregator and/or billing entity 110 may make money on the exchange of foreign currency.

As illustrated by the broken line on FIG. 2, the bill aggregation and/or payment services of the invention can be repeated, generally on a periodic basis, as bills are received and/or payments come due. Hence, in an aspect, the host computer 115 will periodically receive bills from various billing entities (or otherwise determine that a payment is due), inform the user of this fact (e.g., via a consolidated statement), receive confirmation and/or funds from the user, and pay the appropriate amounts due. The frequency of this process is discretionary—in an aspect, the process might be repeated once a month; in another aspect, the process might be repeated on a weekly basis, or as needed (e.g., when bills are received by the host computer).

In some cases, various procedures described with respect to the method 200 of FIG. 2 may be performed on an individual or ad hoc basis. In other cases, one or more of the procedures may be performed on a collective and/or batch basis (whether or not in real time). Merely by way of example, in some embodiments, notifications to one or more users 105 and/or billing entities 110 may be performed as part of a batch notification process. For instance, a batch notification may be provided to a particular billing entity 110 to inform that billing entity 110 that the bill aggregator should receive bills for a plurality of users 105. In other embodiments, payments to a billing entity 110 may be performed as a batch process, perhaps via a single payment (which might use any of the payment mechanisms described above) on behalf of a plurality of users 105. When a single payment is made on behalf of a plurality of users 105, notification of how the single payment should be allocated by the billing entity 110 may be sent or made available by the bill aggregator to the appropriate billing entity 110 via any interface before, with and/or after the bill aggregator provides the batch notification.

FIG. 3 provides a schematic illustration of one embodiment of a computer system 300 that can perform the methods of the invention and/or the functions of host computer, a user computer and/or the like, as described herein. It should be noted that FIG. 3 is meant only to provide a generalized illustration of various components, any or all of which may be utilized as appropriate. FIG. 3, therefore, broadly illustrates how individual system elements may be implemented in a relatively separated or relatively more integrated manner. The computer system 300 is shown comprising hardware elements that can be electrically coupled via a bus 305 (or may otherwise be in communication, as appropriate). The hardware elements can include one or more processors 310, including without limitation one or more general-purpose processors and/or one or more special-purpose processors (such as digital signal processing chips, graphics acceleration chips, and/or the like); one or more input devices 315, which can include without limitation a mouse, a keyboard and/or the like; and one or more output devices 320, which can include without limitation a display device, a printer and/or the like.

The computer system 300 may further include (and/or be in communication with) one or more storage devices 325, which can comprise, without limitation, local and/or network accessible storage and/or can include, without limitation, a disk drive, a drive array, an optical storage device, solid-state storage device such as a random access memory ("RAM") and/or a read-only memory ("ROM"), which can be programmable, flash-updateable and/or the like. The computer system 300 might also include a communications subsystem 330; which can include without limitation a modem, a network card (wireless or wired), an infra-red communication device, and/or the like, a wireless communication device and/or chipset (such as a Bluetooth™ device, an 802.11 device, a WiFi device, a WiMax device, cellular communication facilities, etc.). The computer system 300 and/or communications subsystem 330 may also have the capability to encrypt communications. The communications system 330 may permit data to be exchanged with a network (such as the network 410 described below, and/or any other devices described herein). In many embodiments, the computer system 300 will further comprise a memory 335, which can include a RAM or ROM device, as described above.

The computer system 300 also can comprise software elements, shown as being currently located within the working memory 335, including an operating system 340 and/or other code 345, such as one or more application programs, which may comprise computer programs of the invention and/or may be designed to implement methods of the invention, as described herein. Merely by way of example, one or more procedures described with respect to the method(s) discussed above might be implemented as instructions executable by a computer (and/or a processor within a computer). A set of these instructions might be stored on a computer-readable storage medium, such as the storage device(s) 325 described above. In some cases, the storage medium might be incorporated within a computer system, such that the instructions, when executed by the computer system, perform the procedures of the method(s). In other embodiments, the storage medium might be separate from a computer system (i.e., a removable medium, such as a compact disc, etc.), such that the storage medium can be used to program a generic computer with the instructions stored thereon.

It will be apparent to those skilled in the art that substantial variations may be made in accordance with specific requirements. For example, customized hardware might also be used and/or particular elements might be implemented in hardware, software (including portable software, such as applets), or both. Further, connection to other computing devices such as network input/output devices may be employed.

As noted above, a set of embodiments comprises systems for providing payment consolidation services. Merely by way of example, FIG. 4 illustrates a schematic diagram of a system 400 that can be used in accordance with one set of embodiments. The system 400 can include one or more user computers 405, which can, in an aspect, serve as an interface to various server computers and/or host computers described herein. The user computers 405 can be general purpose personal computers (including, merely by way of example, personal computers and/or laptop computers running any appropriate flavor of Microsoft Corp.'s Windows™ and/or Apple Corp.'s Macintosh™ operating systems) and/or workstation computers running any of a variety of commercially-available UNIX™ or UNIX-like operating systems. These user computers 405 can also have any of a variety of applications, including one or more applications configured (or configurable) to perform methods of the invention, such as web browser applications and/or the like. Alternatively, the user computers 405 can be any other electronic device, such as a thin-client computer, Internet-enabled mobile telephone, and/or personal digital assistant, capable of communicating via a network (e.g., the network 410 described below) and/or displaying and navigating web pages or other types of electronic documents. Although the exemplary system 400 is shown with three user computers, any number of user computers can be supported.

Certain embodiments of the invention operate in a networked environment, which can include a network 410. The network 410 can be any type of network familiar to those skilled in the art that can support data communications using any of a variety of commercially-available protocols, including without limitation TCP/IP, SNA, IPX, AppleTalk, and the like. Merely by way of example, the network 410 can be a local area network ("LAN"), including without limitation an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol such as Global System for Mobile Communication ("GSM"), General Packet Radio Service ("GPRS"), Enhanced Data GSM Environment ("EDGE"), Universal Mobile Telecommunications System ("UMTS"), code division multiple access ("CDMA") and/or time division multiple access ("TDMA") based protocols, Evolution-Data Optimized ("EVDO"), 1xRTT, and i-Mode; and/or any combination of these and/or other networks.

Embodiments of the invention can include one or more server computers 415 (which can, for example, serve as a host computer 115). Each of the server computers 415 may be configured with an operating system including without limitation any of those discussed above, as well as any commercially-available server operating systems, minicomputer operating systems and/or mainframe operating systems. Each of the servers 415 may also be running one or more applications, which can be configured to provide services in furtherance of embodiments of the invention, including without limitation performance of methods of the invention (and/or various operations thereof), as well as traditional transaction processing and/or banking operations.

Merely by way of example, one of the server computers 415 may incorporate, and/or may be in communication, with a web server, which can be used, merely by way of example, to process requests for web pages or other electronic documents from user computers 405 (including, specifically, to serve as a means of communication between a host computer 115 and a user 105, for providing and/or receiving notifications, communications, funds transfers, etc.). A host computer 115 might comprise a web server in some embodiments. In other embodiments, a communication interface 120 of a host computer might provide communication with (and/or might include) a web server, which can act as an intermediary between a user computer 405 and a host computer 115 (or other server 415).

In certain embodiments, the system can include one or more databases 420. The location of the database(s) 420 is discretionary: merely by way of example, a database 420a might reside on a storage medium local to (and/or resident in) a host computer 415a. Alternatively and/or additionally, a database 420b can be remote from any or all of the computers 405, 415, so long as it can be in communication (e.g., via the network 410) with one or more of these. In a particular set of embodiments, a database 420 can reside in a storage-area network ("SAN") familiar to those skilled in the art. In a set of embodiments, a database 420 can be used to store information about transactions processed by the host computers 415, and in particular can comprise one or more tables used to store data in accordance with embodiments of the invention.

While the invention has been described with respect to exemplary embodiments, one skilled in the art will recognize, based on the disclosure herein, that numerous modifications are possible. For example, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware and/or software configuration. Similarly, while various functionality is ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary features, the various components and/or features described herein with respect to a particular embodiment can be substituted, added and/or subtracted from among other described embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A computer-implemented method comprising:
receiving, at a host system from a user device, an enrollment request comprising a user identifier and a plurality of data source identifiers, wherein each data source identifier corresponds to a different billing entity;
receiving, at the host system from the user device, for each of the plurality of data source identifiers, corresponding data source authentication information;
transmitting, from the host system to a first system associated with a first data source identifier of the plurality of data source identifiers, first data source authentication information and the user identifier;
receiving, at the host system, from the first system, a first data set, wherein the first data set comprises first payment data associated with a user that indicates a payment amount and a payment due date associated with a first billing entity;
transmitting, from the host system to a second system associated with a second data source identifier of the plurality of data source identifiers, second data source authentication information and the user identifier, the first system and the second system being distinct;
receiving, at the host system from the second system, a second data set, the first data set being distinct from the second data set, wherein the second data set comprises second payment data associated with the user that indicates a payment amount and a payment due date associated with a second billing entity;
generating, by the host system, based at least in part on the first data set and the second data set, a third data set;
transmitting, by the host system, to the user device, an authentication request;
receiving, at the host system from the user device, biometric information associated with the user;
comparing, by the host system, the received biometric information with previously stored user authentication information to authenticate the user;
in response to authenticating the user, transmitting to the user device, the third data set;
receiving, at the host system from the user device, a data set selection indicating a selection of a data set within the third data set;
identifying, by the host system, a system associated with the selected data set, wherein the system comprises a financial account associated the user;
initiating, by the host system, a first automated clearing house (ACH) transfer from the financial account to the first billing entity for less than the payment amount indicated in the first payment data;
initiating, by the host system, a second ACH transfer from the financial account to the second billing entity for less than the payment amount indicated in the second payment data;
receiving, at the host system from the system, a notification that at least one payment has been made to the first billing entity and the second billing entity; and
transmitting, from the host system to the user device, the notification.

2. The computer-implemented method of claim 1, wherein the biometric information comprises at least one of a fingerprint, a voice print, or an eye scan.

3. The computer-implemented method of claim 1, further comprising:
receiving, by the host system, user payment information associated with the user identifier, the user payment information indicating information to withdraw funds on behalf of the user from the financial account;
transmitting, by the host system the user payment information to a financial institution associated with the financial account;
receiving, by the host system from the financial institution, digital assets associated with the user; and
transmitting one or more digital assets to the first billing entity or the second billing entity.

4. The computer-implemented method of claim 1, wherein the third data set comprises at least the first data set and the second data set.

5. A non-transitory, computer-readable storage medium having stored thereon instructions for causing at least one computer system to authenticate to multiple data sources, the instructions, when executed by the at least one computer system, causing the at least one computer system to perform operations comprising:
receiving, from a user device, an enrollment request comprising a user identifier and a plurality of data source identifiers, wherein each data source identifier corresponds to a different billing entity;

receiving, from the user device, for each of the plurality of data source identifiers, corresponding data source authentication information;

transmitting, to a first system associated with a first data source identifier of the plurality of data source identifiers, first data source authentication information and the user identifier;

receiving, from the first system, a first data set, wherein the first data set comprises first payment data associated with a user that indicates a payment amount and a payment due date associated with a first billing entity;

transmitting, to a second system associated with a second data source identifier of the plurality of data source identifiers, second data source authentication information and the user identifier, the first system and the second system being distinct;

receiving, from the second system, a second data set, the first data set being distinct from the second data set, wherein the second data set comprises second payment data associated with the user that indicates a payment amount and a payment due date associated with a second billing entity;

generating, based at least in part on the first data set and the second data set, a third data set;

transmitting, to the user device, an authentication request;

receiving, from the user device, biometric information associated with the user;

comparing the received biometric information with previously stored user authentication information to authenticate the user;

in response to authenticating the user associated with the user identifier, transmitting, the third data set;

receiving, from the user device, a data set selection indicating a selection of a data set within the third data set;

identifying, a system associated with the selected data set, wherein the system comprises a financial account associated the user;

initiating a first automated clearing house (ACH) transfer from the financial account to the first billing entity for less than the payment amount indicated in the first payment data;

initiating a second ACH transfer from the financial account to the second billing entity for less than the payment amount indicated in the second payment data;

receiving a notification that at least one payment has been made to the first billing entity and the second billing entity; and transmitting to the user device, the notification.

6. The non-transitory, computer-readable storage medium of claim 5, wherein the biometric information comprises at least one of a fingerprint, a voice print, or an eye scan.

7. The non-transitory, computer-readable storage medium of claim 5, the operations further comprising:

receiving user payment information associated with the user identifier, the user payment information indicating information to withdraw funds on behalf of the user from the financial account;

transmitting the user payment information to a financial institution associated with the financial account;

receiving, from the financial institution, digital assets associated with the user; and transmitting one or more digital assets to the first billing entity or the second billing entity.

8. The non-transitory, computer-readable storage medium of claim 5, wherein the third data set comprises at least the first data set and the second data set.

9. A system for authenticating to multiple data sources, the system comprising:

one or more processors; and a memory coupled with the one or more processors, the memory configured to store instructions that, when executed by the one or more processors, cause the one or more processors to:

receive, from a user device, an enrollment request comprising a user identifier and a plurality of data source identifiers, wherein each data source identifier corresponds to a different billing entity;

receive, from the user device, for each of the plurality of data source identifiers, corresponding data source authentication information;

transmit, to a first system associated with a first data source identifier of the plurality of data source identifiers, first data source authentication information and the user identifier;

receive, from the first system, a first data set, wherein the first data set comprises first payment data associated with a user that indicates a payment amount and a payment due date associated with a first billing entity;

transmit, to a second system associated with a second data source identifier of the plurality of data source identifiers, second data source authentication information and the user identifier, the first system and the second system being distinct;

receive, from the second system, a second data set, the first data set being distinct from the second data set wherein the second data set comprises second payment data associated with the user that indicates a payment amount and a payment due date associated with a second billing entity;

generate, based at least in part on the first data set and the second data set, a third data set;

transmit, to the user device, an authentication request;

receive, from the user device, biometric information associated with the user;

compare the received biometric information with previously stored user authentication information to authenticate the user;

in response to authenticating the user, transmit, to the user device, the third data set;

receive, from the user device, a data set selection indicating a selection of a data set within the third data set;

identify a system associated with the selected data set, wherein the system comprises a financial account associated with the user;

initiate a first automated clearing house (ACH) transfer from the financial account to the first billing entity for less than the payment amount indicated in the first payment data;

initiate a second ACH transfer from the financial account to the second billing entity for less than the payment amount indicated in the second payment data;

receive a notification that at least one payment has been made to the first billing entity and the second billing entity; and transmit, to the user device, the notification.

10. The system of claim 9, wherein the biometric information comprises at least one of a fingerprint, a voice print, or an eye scan.

11. The system of claim 9, wherein the instructions, when executed by the one or more processors, further cause the one or more processors to:

receive user payment information associated with the user identifier, the user payment information indicating information to withdraw funds on behalf of the user from the financial account;

transmit the user payment information to a financial institution associated with the financial account;

receive, from the financial institution, digital assets associated with the user; and transmit one or more digital assets to the first billing entity or the second billing entity.

12. The system of claim 9, wherein the third data set comprises at least the first data set and the second data set.

* * * * *